(12) United States Patent
Basso et al.

(10) Patent No.: US 9,143,441 B2
(45) Date of Patent: *Sep. 22, 2015

(54) SLICED ROUTING TABLE MANAGEMENT

(71) Applicant: International Business Machines Corporation, Armonk, NY (US)

(72) Inventors: Claude Basso, Nice (FR); David A. Shedivy, Rochester, MN (US); Colin B. Verrilli, Apex, NC (US); Bruce M. Walk, Rochester, MN (US); Daniel Wind, Nice (FR)

(73) Assignee: International Business Machines Corporation, Armonk, NY (US)

( * ) Notice: Subject to any disclaimer, the term of this patent is extended or adjusted under 35 U.S.C. 154(b) by 388 days.

This patent is subject to a terminal disclaimer.

(21) Appl. No.: 13/778,400

(22) Filed: Feb. 27, 2013

(65) Prior Publication Data

US 2014/0064281 A1 Mar. 6, 2014

Related U.S. Application Data

(63) Continuation of application No. 13/597,784, filed on Aug. 29, 2012.

(51) Int. Cl.
 *H04L 12/28* (2006.01)
 *H04L 12/721* (2013.01)
 *H04L 12/743* (2013.01)
 *H04L 12/56* (2006.01)

(52) U.S. Cl.
 CPC ............ *H04L 45/44* (2013.01); *H04L 45/7453* (2013.01)

(58) Field of Classification Search
 CPC . H04L 45/54; H04L 49/3009; H04L 12/4601; H04L 49/309; H04L 45/00; H04L 11/0478; H04L 45/745; H04L 45/44; H04L 45/7453
 See application file for complete search history.

(56) References Cited

U.S. PATENT DOCUMENTS

| 5,265,092 | A | 11/1993 | Soloway et al. |
| 6,819,671 | B1 | 11/2004 | Chen et al. |
| 7,007,100 | B1 | 2/2006 | Doong et al. |
| 7,352,748 | B1 * | 4/2008 | Rozario et al. ............... 370/392 |
| 7,593,400 | B2 | 9/2009 | Zelig et al. |
| 7,738,454 | B1 | 6/2010 | Panwar et al. |
| 8,160,056 | B2 | 4/2012 | Van der Merwe et al. |
| 8,787,373 | B2 | 7/2014 | Cors et al. |
| 8,817,796 | B2 | 8/2014 | Basso et al. |
| 8,854,973 | B2 | 10/2014 | Basso et al. |

(Continued)

OTHER PUBLICATIONS

U.S. Patent Application entitled Sliced Routing Table Management With Replication, U.S. Appl. No. 14/242,455, filed Apr. 1, 2014.

(Continued)

*Primary Examiner* — Andrew Lai
*Assistant Examiner* — M Mostazir Rahman
(74) *Attorney, Agent, or Firm* — Patterson & Sheridan, LLP

(57) ABSTRACT

Techniques are provided for hash-based routing table management in a distributed network switch. A frame having a source address and a destination address is received. If no routing entry for the source address is found in a routing table of a switch module in the distributed network switch, where the routing table is divided into slices of buckets, then routing information is determined for the source address and a routing entry is generated. The routing table is modified to include the routing entry and based on a set of hash functions and properties of the slices.

18 Claims, 10 Drawing Sheets

(56) References Cited

U.S. PATENT DOCUMENTS

| | | |
|---|---|---|
| 8,867,550 B2 | 10/2014 | Bawsso et al. |
| 8,879,562 B2 | 11/2014 | Basso et al. |
| 8,885,518 B2 | 11/2014 | Basso et al. |
| 8,917,627 B2 | 12/2014 | Basso et al. |
| 2003/0218978 A1* | 11/2003 | Brown .......................... 370/230 |
| 2004/0133634 A1 | 7/2004 | Luke et al. |
| 2004/0156362 A1* | 8/2004 | Pathi et al. ................... 370/389 |
| 2005/0141519 A1* | 6/2005 | Rajgopal et al. ......... 370/395.32 |
| 2005/0147113 A1* | 7/2005 | Brown .......................... 370/428 |
| 2005/0220109 A1 | 10/2005 | Sudo et al. |
| 2006/0018321 A1 | 1/2006 | Yamada et al. |
| 2006/0023724 A1* | 2/2006 | Na et al. .................. 370/395.53 |
| 2006/0036765 A1 | 2/2006 | Weyman |
| 2006/0294211 A1 | 12/2006 | Amato |
| 2007/0183334 A1 | 8/2007 | White et al. |
| 2008/0062891 A1 | 3/2008 | Van der Merwe et al. |
| 2008/0069100 A1 | 3/2008 | Weyman et al. |
| 2008/0159144 A1 | 7/2008 | Nagarajan et al. |
| 2008/0205272 A1* | 8/2008 | Vasseur et al. ................. 370/235 |
| 2008/0239957 A1 | 10/2008 | Tokura et al. |
| 2008/0240106 A1* | 10/2008 | Schlenk ......................... 370/392 |
| 2008/0279188 A1 | 11/2008 | Alfieri et al. |
| 2008/0304497 A1 | 12/2008 | Viswanath et al. |
| 2009/0232139 A1 | 9/2009 | Kelley |
| 2009/0274044 A1 | 11/2009 | Goose et al. |
| 2010/0011028 A1 | 1/2010 | Dade |
| 2010/0020795 A1 | 1/2010 | Devarajan et al. |
| 2010/0245378 A1 | 9/2010 | Matsuura |
| 2010/0254377 A1 | 10/2010 | Akella et al. |
| 2010/0254378 A1 | 10/2010 | Akella et al. |
| 2011/0051837 A1 | 3/2011 | Park et al. |
| 2011/0188503 A1* | 8/2011 | Hewson ........................ 370/392 |
| 2011/0261815 A1 | 10/2011 | Armstrong et al. |
| 2011/0264610 A1* | 10/2011 | Armstrong et al. ............. 706/12 |
| 2011/0271102 A1* | 11/2011 | Smith ........................... 713/160 |
| 2011/0280248 A1* | 11/2011 | Singh et al. ................... 370/401 |
| 2012/0257565 A1 | 10/2012 | Laroche et al. |
| 2013/0028258 A1 | 1/2013 | Carney et al. |
| 2013/0044645 A1 | 2/2013 | Castro Castro et al. |
| 2013/0058338 A1 | 3/2013 | Guttman et al. |
| 2013/0188637 A1 | 7/2013 | Cors et al. |
| 2013/0188640 A1 | 7/2013 | Cors et al. |
| 2013/0194964 A1 | 8/2013 | Basso et al. |
| 2013/0195105 A1 | 8/2013 | Basso et al. |
| 2013/0201989 A1* | 8/2013 | Hu et al. ....................... 370/392 |
| 2013/0242985 A1 | 9/2013 | Basso et al. |
| 2013/0242986 A1 | 9/2013 | Basso et al. |
| 2013/0242988 A1 | 9/2013 | Basso et al. |
| 2014/0064090 A1 | 3/2014 | Basso et al. |
| 2014/0064091 A1 | 3/2014 | Basso et al. |
| 2014/0064092 A1 | 3/2014 | Basso et al. |
| 2014/0064093 A1 | 3/2014 | Basso et al. |
| 2014/0064276 A1 | 3/2014 | Basso et al. |
| 2014/0064277 A1 | 3/2014 | Basso et al. |
| 2014/0064282 A1 | 3/2014 | Basso et al. |
| 2014/0211806 A1 | 7/2014 | Basso et al. |

OTHER PUBLICATIONS

U.S. Appl. No. 13/353,737, entitled Multicast Miss Notification for a Distributed Network Switch, filed Jan. 19, 2012.

U.S. Appl. No. 13/597,784, entitled Sliced Routing Table Management, filed Aug. 29, 2012.

U.S. Appl. No. 13/597,636, entitled Cached Routing Table Management, filed Aug. 29, 2012.

U.S. Appl. No. 13/363,434, entitled Synchronizing Routing Tables in a Distributed Network Switch, filed Feb. 1, 2012.

U.S. Appl. No. 13/597,386, entitled Hashing-Based Routing Table Management, filed Aug. 29, 2012.

U.S. Appl. No. 13/597,807, entitled Sliced Routing Table Management With Replication, filed Aug. 29, 2012.

* cited by examiner

SLICED ROUTING TABLE MANAGEMENT

CROSS-REFERENCE TO RELATED APPLICATIONS

This application is a continuation of co-pending U.S. patent application Ser. No. 13/597,784, filed Aug. 29, 2012. The aforementioned related patent application is herein incorporated by reference in its entirety.

BACKGROUND

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

SUMMARY

Embodiments of the invention provide a method, product and system for performing an operation for hash-based routing table management in a distributed network switch including a set of switch modules. The switch modules include at least a first switch module. The operation includes receiving, by the first switch module, a first frame having a source address and a destination address. The first switch module includes bridge elements and a routing table. The routing table in the first switch module is shared among the bridge elements in the first switch module and includes sets of buckets. Each set of buckets is associated with a respective hash function of a set of hash functions and is divided into slices of buckets. Each slice has a respective property and includes one or more buckets. The operation further includes, upon determining that the routing table in the first switch module does not include a routing entry for the source address, generating a routing entry for the source address, based on routing information determined for the source address. The routing table in the first switch module is modified, based on the hash functions and the respective properties of the slices, to include the routing entry generated for the source address.

Embodiments of the invention also provide a method to increase access bandwidth of a routing table by distributing lookup hits in the routing table across hash tables and slices. The method includes providing the routing table, where the routing table is divided into hash tables accessible in parallel, each hash table having a distinct hash function. At least one hash function is selected based on a set of hash properties. Further, each hash table is divided into slices accessible in parallel, each slice including one or more buckets. Each bucket is configured to store one or more routing entries. The method also includes facilitating, at least in part, even distribution of subsequent lookup hits expected to occur in the routing table for routing entries, by preemptively inserting the routing entries into the routing table based on a set of insertion properties of the routing table.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
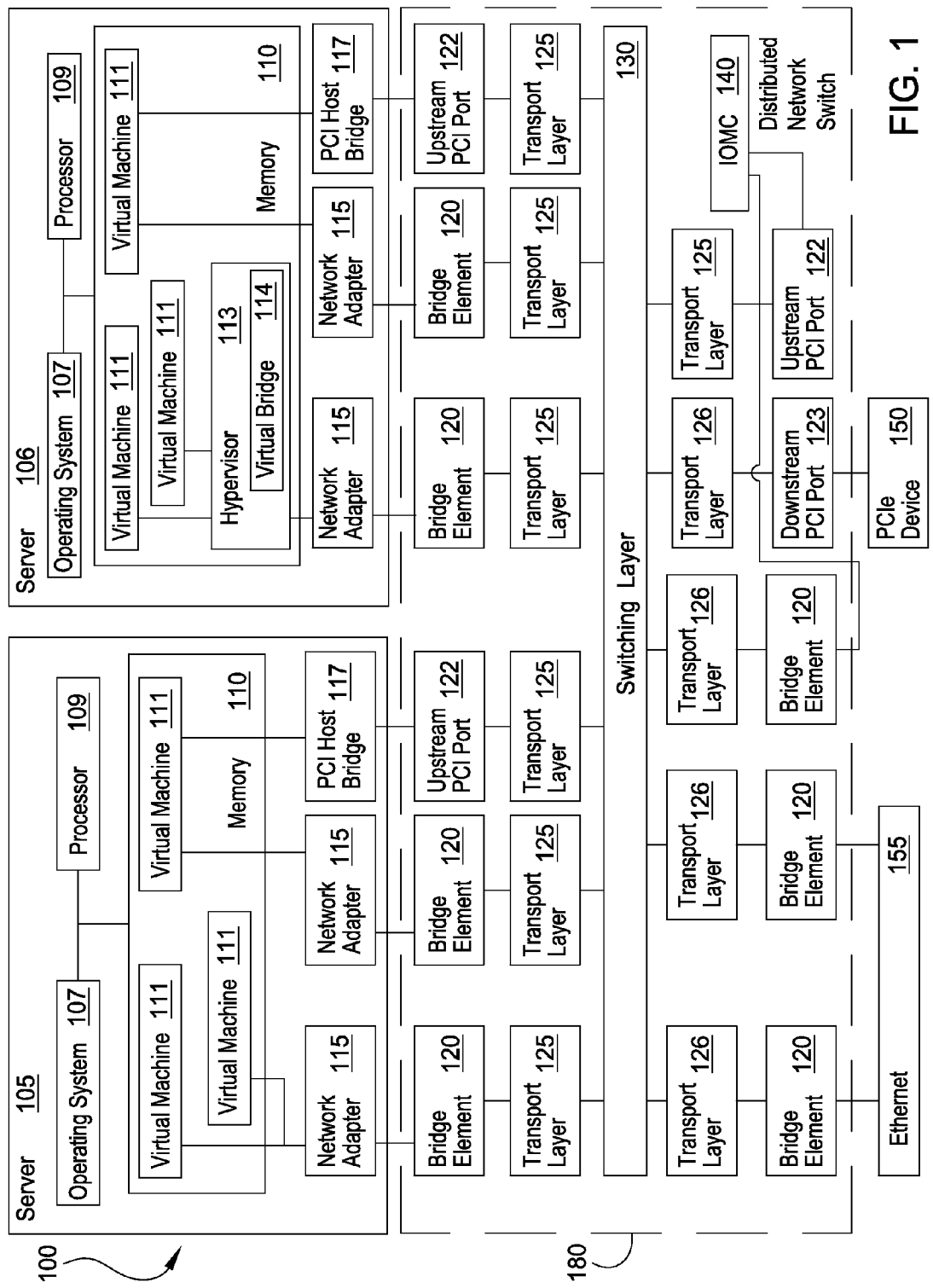
FIG. 1 illustrates a system architecture that includes a distributed network switch, according to one embodiment of the invention.

Embodiments of the invention provide techniques for hash-based routing table management in a distributed network switch. One embodiment provides a first switch module configured to receive a first frame having a source address and a destination address. Upon determining that a routing entry for the source address does not exist in a routing table of the first switch module, the first switch module determines routing information for the source address and generates the routing entry for the source address based on the routing information. The first switch module then modifies the routing table to include the routing entry generated for the source address and based on a plurality of distinct hash functions. Using the techniques for hash-based routing table management disclosed herein may facilitate quicker access to the routing table at least in some cases, relative to alternative approaches for managing the routing table. For example, in a particular embodiment, the routing table may be divided into hash tables accessible in parallel, and each hash table may further be divided into slices accessible in parallel. Preemptively, the hash functions may be selected and/or routing entries may be inserted into the routing table—in a manner such as to facilitate, at least in part, even distribution of subsequent lookup hits expected to occur in the routing table for the routing entries. Accordingly, the distributed network switch may operate more efficiently at least in some cases.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a system architecture that includes a distributed network switch, according to one embodiment of the invention. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105.

The server 105 may operate under the control of an operating system 107 and execute various computer software applications, components, programs, objects, modules, and data structures, such as virtual machines 111.

The server 105 may include network adapters 115 (e.g., converged network adapters, or CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the switch fabric, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120, also referred to herein as bridging elements. Additionally, to facilitate PCIe communication, the server may have a PCI Host Bridge 117. The PCI Host Bridge would then connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed network switch 180. For example, a network adapter 115 and bridge element 120 may be connected using two 40 Gbit Ethernet connections or one 100 Gbit Ethernet connection. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180.

The distributed network switch 180, in general, includes a plurality of bridge elements 120 that may be located on a plurality of a separate, though interconnected, hardware components. To the perspective of the network adapters 115, the distributed network switch 180 acts like one single switch even though the distributed network switch 180 may be composed of multiple switches that are physically located on different components. Distributing the network switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect (LRI) which connects bridge elements 120 located within the same chassis and rack, as well as links that connect to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the distributed network switch 180.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130.

Although one IOMC 140 is shown, the system 100 may include a plurality of IOMCs 140. In one embodiment, these IOMCs 140 may be arranged in a hierarchy such that one IOMC 140 is chosen as a master while the others are delegated as members.

Figure 2:
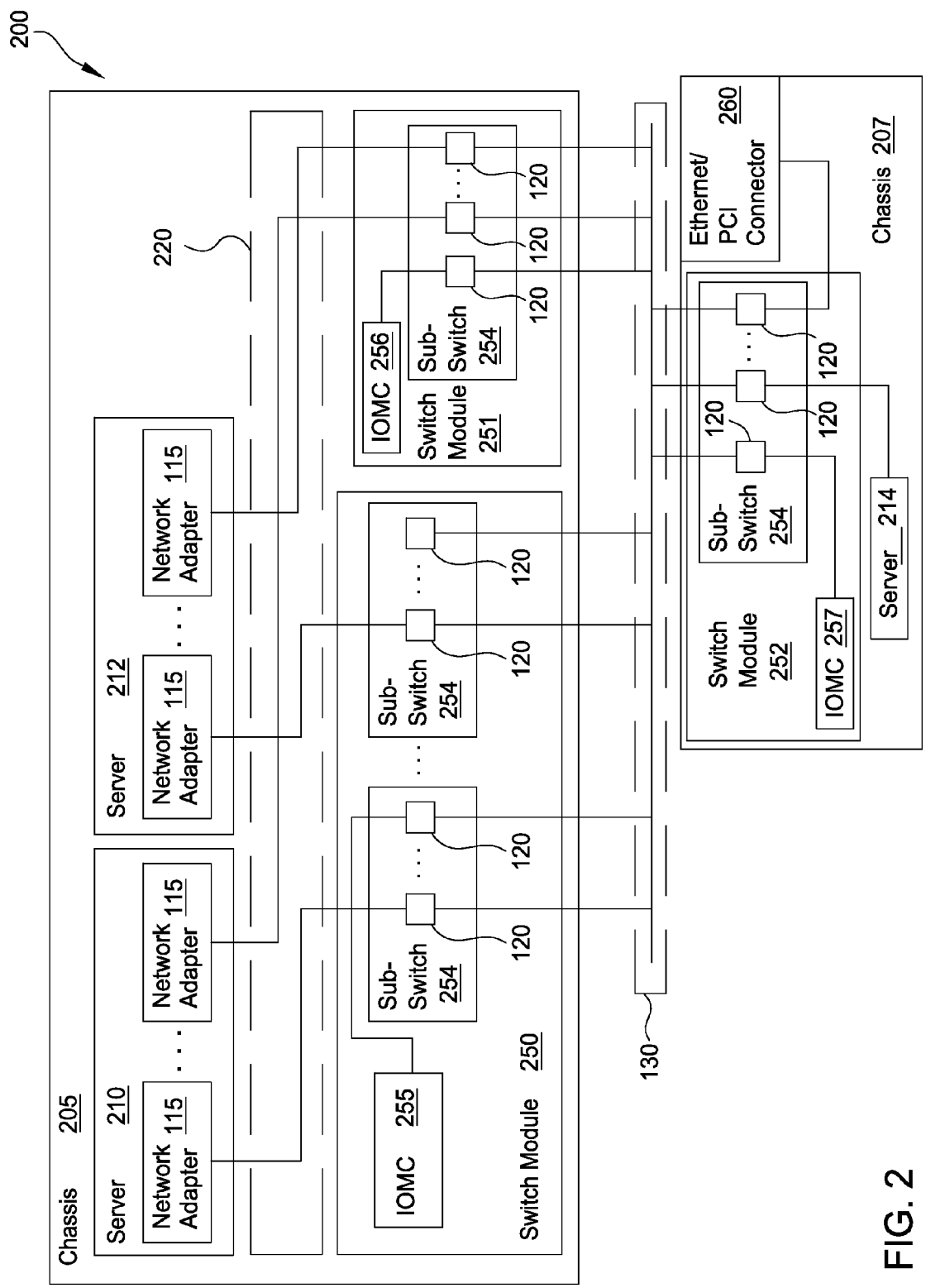
FIG. 2 illustrates the hardware representation of a system that implements a distributed network switch, according to one embodiment of the invention.

FIG. 2 illustrates a hardware level diagram of the system 100, according to one embodiment of the invention. Server 210 and 212 may be physically located in the same chassis 205; however, the chassis 205 may include any number of servers. The chassis 205 also includes a plurality of switch modules 250, 251 that include one or more sub-switches 254. In one embodiment, the switch modules 250, 251, 252 are hardware components (e.g., PCB boards, FPGA boards, system on a chip, etc.) that provide physical support and connectivity between the network adapters 115 and the bridge elements 120. In general, the switch modules 250, 251, 252 include hardware that connects different chassis 205, 207 and servers 210, 212, 214 in the system 200.

The switch modules 250, 251, 252 (i.e., a chassis interconnect element) include one or more sub-switches 254 and an IOMC 255, 256, 257. The sub-switches 254 may include a logical or physical grouping of bridge elements 120. Each bridge element 120 may be physically connected to the servers 210, 212. For example, a bridge element 120 may route data sent using either Ethernet or PCI communication protocols to other bridge elements 120 attached to the switching layer 130. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module.

The dotted line in chassis 205 defines the midplane 220 between the servers 210, 212 and the switch modules 250, 251. That is, the midplane 220 includes the data paths that transmit data between the network adapters 115 and the sub-switches 254.

Each bridge element 120 connects to the switching layer 130. In addition, a bridging element 120 may also connect to a network adapter 115 or an uplink. As used herein, an uplink port of a bridging element 120 provides a service that expands the connectivity or capabilities of the system 200. As shown in chassis 207, one bridging element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridging elements 120 to update the routing tables and lookup tables to include the hardware elements on the new switching module.

Figure 3:
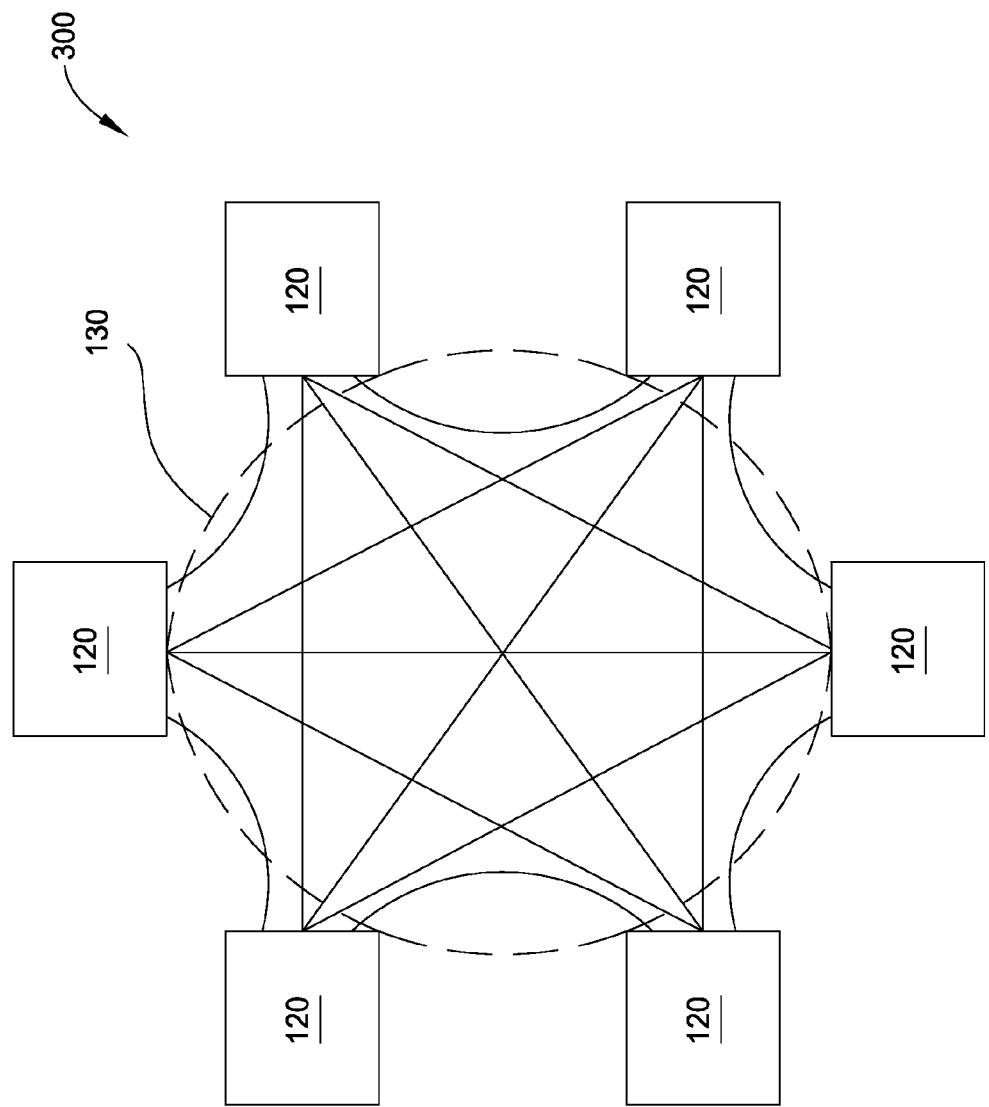
FIG. 3 illustrates a distributed network switch, according to one embodiment of the invention.

FIG. 3 illustrates a virtual switching layer, according to one embodiment of the invention. Each bridging element 120 in the systems 100 and 200 are connected to each other using the switching layer 130 via a mesh connection schema. That is, no matter the bridging element 120 used, a cell (i.e., data packet) can be routed to another bridging element 120 located on any other switch module 250, 251, 252. This may be accomplished by directly connecting each bridging element 120—i.e., each bridging element 120 has a dedicated data path to every other bridging element 120. Alternatively, the switching layer 130 may use a spine-leaf architecture where each bridging element 120 (i.e., a leaf node) is attached to at least one spine node. The spine nodes route cells received from the bridging elements 120 to the correct spine node which then forwards the data to the correct bridging element 120. However, this invention is not limited to any particular technique for interconnecting the bridging elements 120.

Accordingly, the distributed network switch disclosed herein is configured to provide Layer 2 Ethernet switching via: multiple switch modules 250, 251, the LRI interconnecting the switch modules 250, 251, and management firmware executing on a management controller such as the IOMC 255, 256, 257. Doing so may eliminate the need for stand-alone Ethernet switches to interconnect processing elements in the servers 105, 106. At least in some embodiments, the networked system may also be augmented in a granular and/or scalable manner by adding individual components such as switch modules and/or processing elements.

In one embodiment, each switch module 250, 251 is operatively connected to multiple bridge elements. In a particular embodiment, each switch module is configured to use five bridge elements, where each bridge element is a distributed Virtual Ethernet Bridge (dVEB) that supports data transfer rates of one hundred gigabits per second (100 Gbps). The dVEBs are managed by firmware executing on the management controller.

Figure 4:
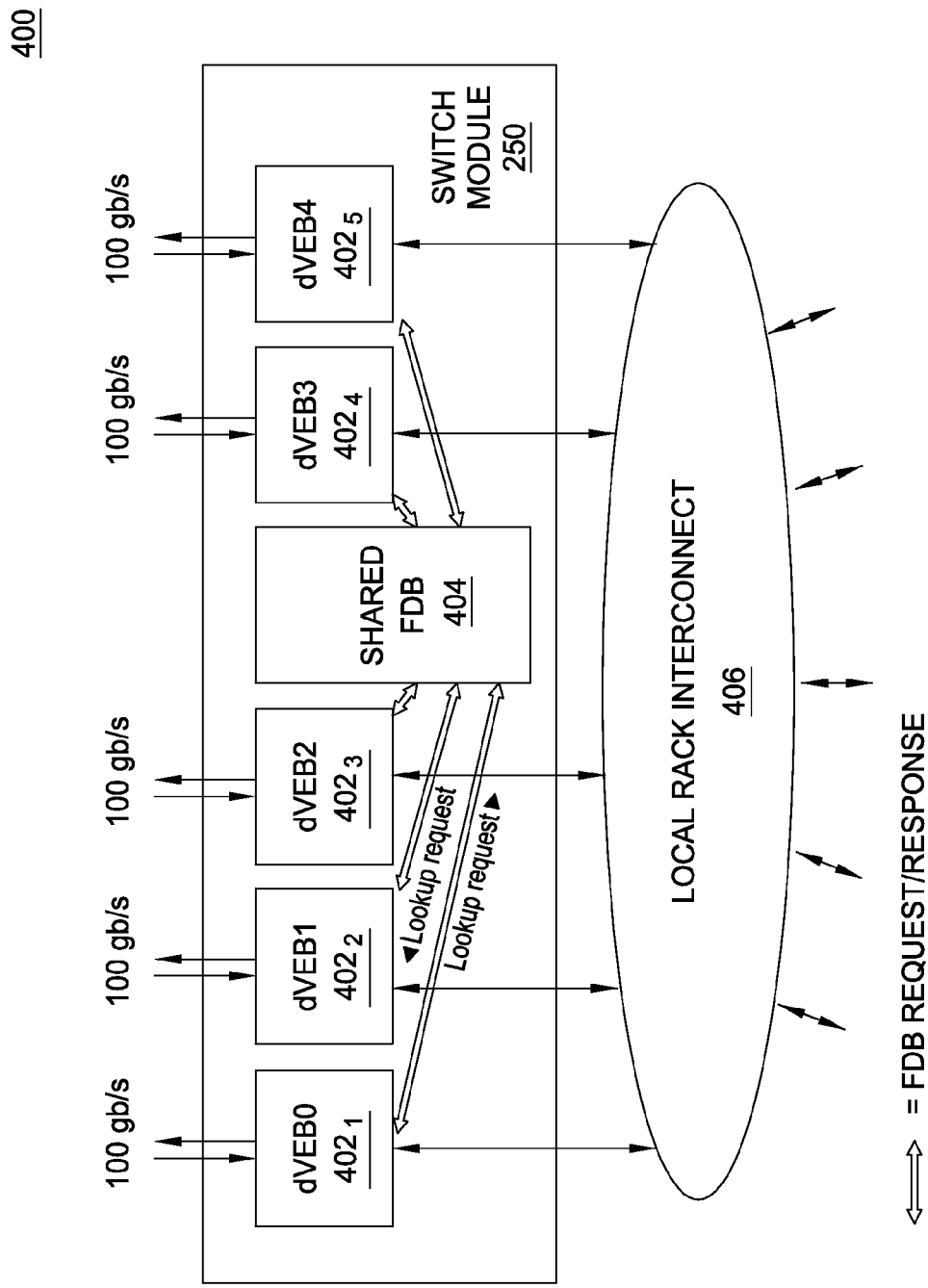
FIG. 4 is a block diagram depicting components of a switch module of the distributed network switch, according to one embodiment of the invention.

FIG. 4 is a block diagram depicting components of the switch module 250 of FIG. 2, according to one embodiment of the invention. As shown, the switch module 250 includes multiple bridge elements $402_{1-5}$ and a routing table 404 shared between the multiple bridge elements, also referred to as a forwarding data base (FDB). In this particular example, the bridge elements $402_{1-5}$ are dVEBs. Further, as described above, each switch module is operatively connected to an LRI 406. Each bridge element $402_{1-5}$ is configured to send a routing information lookup request to the routing table 404, and routing table 404 is configured to send a routing information lookup response to the requesting bridge element.

In one embodiment, responsive to an Ethernet frame entering an ingress port, the switch module accesses the routing table to determine if the source and/or destination addresses are present in the routing table. For example, each bridge element $402_{1-5}$ generates a destination address lookup and a source address lookup per frame to the routing table. Each bridge element $402_{1-5}$ then uses routing information received from the lookups to send the frame to the destination. At least in some embodiments, it is desirable that such lookups have direct access to a complete set of learned routing information in the distributed network switch. If only a subset of the routing information is cached locally, such as is further described below, the switch module may need to query a non-local routing table, introducing additional latency and/or complexity to the lookups. On the other hand, the complete set of learned routing information quickly become large when virtualization is used.

For example, a networked system having 640 server nodes each configured to support 256 MAC addresses results in 163,840 possible MAC addresses that need to be accounted for within the networked system. To facilitate managing routing tables of sufficient size to accommodate such networked systems, the routing tables may be shared among bridge elements as described herein—as opposed to each bridge element having its own respective routing table. Any routing table indexing scheme used should take into account the size of the MAC addresses, e.g., 48 bits in length, and any property of the MAC addresses, such as the property of having no inherent ordering. Further, as Ethernet link speeds increase, such as to 100 Gbit/s and beyond, in order to keep up with 64-byte Ethernet frames, a frame needs to be handled every 6.72 nanoseconds on each port, including two address lookups per frame. Additional routing table processing bandwidth per frame is also desirable to perform other operations such as management and refresh operations. At least in some embodiments, lookup responses are received by a switch module in the same order as the lookup requests were previously sent by the switch module.

Figure 5:
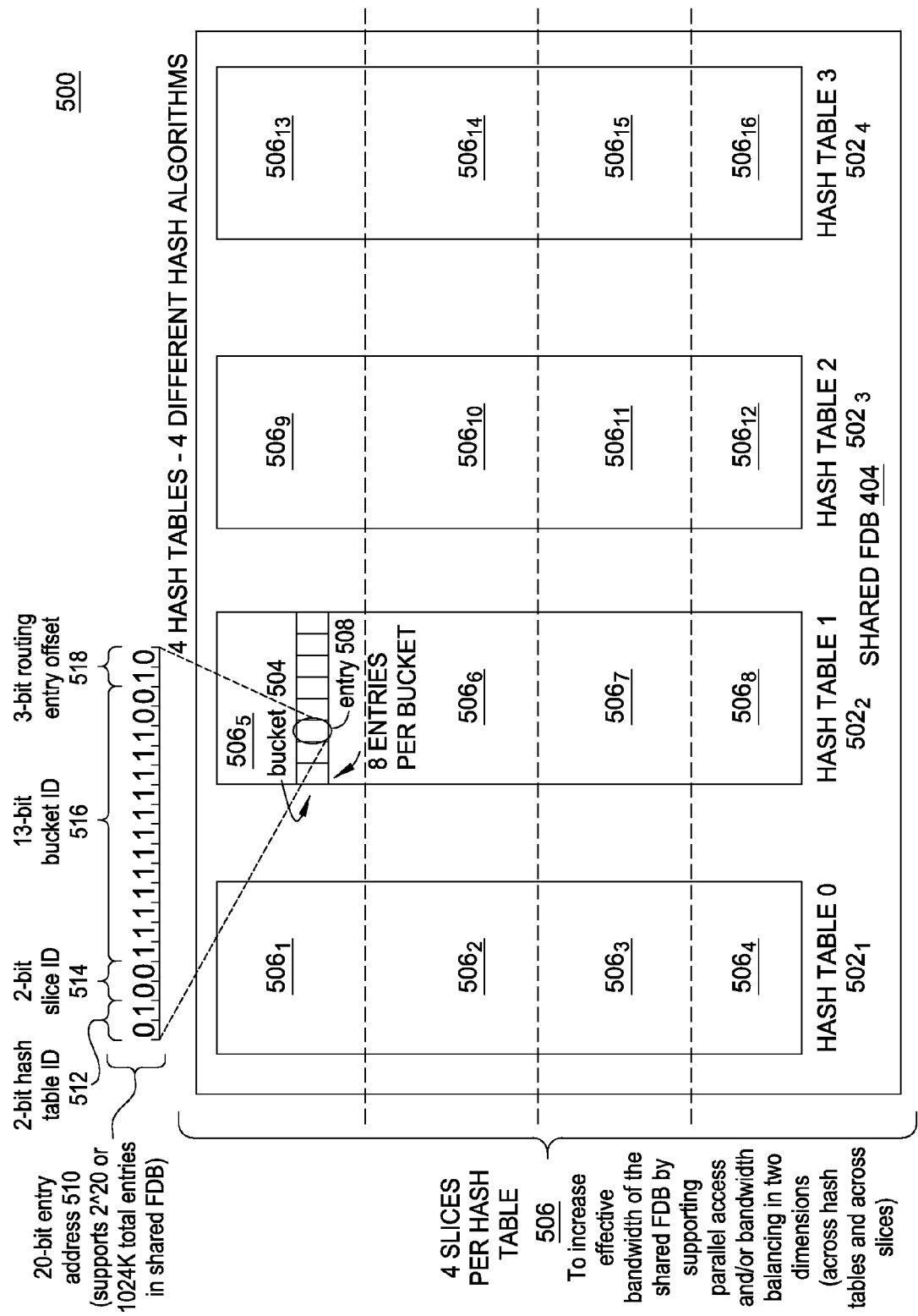
FIG. 5 is a block diagram depicting components of a routing table of the switch module, according to one embodiment of the invention.

FIG. 5 is a block diagram depicting components of the routing table 404 of FIG. 4, according to one embodiment of the invention. As shown, the routing table 404 includes a predetermined number of hash tables $502_{1-4}$, each hash table $502_{1-4}$ having a predetermined number of buckets, such as bucket 504, and each bucket being configured to store up to a predetermined number of routing entries configured to store routing information. In some embodiments, the size of the routing table 404 is predetermined to yield a routing table storage utilization of 50% or lower, based on a current number of routing entries expected. Further, each hash table may include a predetermined number of slices 506, each slice implemented as an independent array data structure configured to support parallel access, relative to the other slices. For instance, a configuration of four hash tables, each having four slices, provides up to sixteen parallel accesses to the routing table per clock cycle. Although the configuration of four slices per hash table has shown to be useful at least in some cases, other counts of slices per hash table may be used without departing from the scope of the present disclosure. Each slice may be associated with one or more properties specific to the respective slice. For example, each slice may be associated with an access frequency property characterizing the respective slice. Access to the slices may be managed by a predetermined entity, such as an arbiter component of the routing table. In some alternative embodiments, rather than being divided into slices, each hash table itself is implemented as a single, independent array data structure.

In one embodiment, each hash table is identifiable via a hash table identifier that is distinct within the routing table. Further, each bucket is identifiable via a bucket identifier that is distinct within the hash table of the respective bucket. Further still, each slice is identifiable via a slice identifier that is distinct within the hash table of the respective slice. Depending on the embodiment, the slice identifier may be a subset of bits of the bucket identifier or may be separate from the bucket identifier. Similarly, the hash table may be a subset of bits of the bucket identifier (and/or of the slice identifier) or may be separate from the bucket identifier and/or slice identifier.

In one embodiment, each hash table $502_{1-4}$ is associated with a distinct hash function. At least in some embodiments, the distinct hash functions are used to reduce a frequency of collisions of routing table entries. To this end, one or more of the hash functions may be chosen based on a determined or estimated collision property representing a frequency of collisions of routing table entries for a predefined set of distinct inputs. The collision property may also be referred to herein as an intra-hash collision property. Further, one or more of the hash functions may be chosen based on a determined or estimated avalanche property of the respective hash function. A hash function is regarded as having a strong avalanche property if a small change to the input to the hash function results in a large change in the output. For example, a hash function is said to have a strong avalanche property if a change in a single bit of the input results in many bits being changed in the output.

Additionally or alternatively, in one embodiment, each hash function may be chosen based on a determined or estimated inter-hash collision property such that any two distinct inputs yielding a collision in a given hash table should not yield a collision in any of the other hash tables—or should collide in as few of the other hash tables as possible. In other words, any two distinct inputs hashing to a single bucket in one hash table should not hash to a single bucket in any of the other hash tables. At least in some embodiments, the distinct hash functions are chosen to minimize the number of two distinct inputs hashing to a single bucket in multiple hash tables. Further, each hash function may be chosen based on a predefined property of the slices. The property may include any data characterizing each slice relative to the other slices. For example, each hash function may be chosen based on a determined or estimated inter-slice distribution property such that incoming address lookup requests result in a uniform distribution of accesses across the slices of each hash table.

In one embodiment, each of the avalanche property, the intra-hash collision property, the inter-hash collision property, and the inter-slice distribution property may be determined or estimated by applying the hash function to a predefined set of inputs or based on one or more predefined property estimation rules provided by a user. At least in some embodiments, these properties of hash functions may also be evaluated during runtime by the arbiter component of the routing table. In one embodiment, the number of access requests to the slices may be as large as a count of bridge elements per switch module multiplied by a count of lookups per bridge element further multiplied by a count of hash table requests per lookup, e.g., 5*2*4=40. In one embodiment, assuming each frame is sixty-four bytes in size and spans a window of three clock cycles, if the routing table includes sixteen total slices across all hash tables, then a maximum of forty-eight accesses may be accommodated over the window of three clock cycles. The maximum is sufficient to service even a worst-case scenario in which all ports are simultaneously receiving back-to-back, sixty-four-byte frames and in which forty accesses are requested per three-cycle window.

In one embodiment, the routing table is configured to support a normal insertion mode and a bandwidth insertion mode. The bandwidth insertion mode is also referred to herein as an access frequency mode or a bandwidth-balancing mode. At least in some embodiments, a user may specify which mode is the active mode. The arbiter component of the routing table may monitor, for each slice in the routing table, a rate of successful routing entry lookups in the respective slice. The rate is also referred to herein as a hit rate. When the bandwidth insertion mode is active, the arbiter component determines a set of candidate slices from different hash tables, into which to insert a new routing entry. The arbiter component then selects the candidate slice having a lowest hit rate, as the slice into which to insert the new routing entry. In contrast, when in normal insertion mode, the selection of a hash table and/or a slice into which to insert a new routing entry is not dependent on the monitored hit rates. Normal insertion mode is further described below in conjunction with FIGS. 6-8. Bandwidth insertion mode is further described below in conjunction with FIG. 9.

In one embodiment, each hash function may be cryptographic or non-cryptographic. Examples of non-cryptographic hash functions include, without limitation, Pearson hash function, Fowler-Noll-Vo hash function, Zobrist hash function, Jenkins hash function, Bernstein hash function, elf64 hash function, MurmurHash function, SpookyHash function, and CityHash function. Examples of cryptographic hash functions include, without limitation, Gosudarstvennyi Standard Soyuza SSR (GOST) hash function, Hash of Variable Length (HAVAL) hash function, message digest algorithm hash function (such as MD2, MD4, and MD5), PANAMA hash function, RadioGatún hash function, RACE Integrity Primitives Evaluation Message Digest (RIPEMD) hash function, secure hash algorithm (SHA) hash function, Tiger hash function, and Whirlpool hash function.

In one embodiment, a routing entry is inserted, updated, and/or retrieved into a given hash table, by using the hash function associated with the given hash table to generate a hash value based on a routing key of the routing entry. The hash value may then be used as a bucket identifier to identify a bucket of the hash table associated with the hash function used. As described above, in embodiments where the hash tables are divided into slices, a predetermined number of bits of the hash value may be used to identify a particular slice. For example, two bits of the hash value may be used to uniquely identify one of the four slices of a hash table. In some embodiments, a hash value from each hash function is generated using the routing key, and the identified buckets, also referred to herein as candidate buckets, are evaluated to determine a least-full bucket (i.e., among the candidate buckets), into which the routing entry is then inserted. At least in some embodiments, if multiple candidate buckets are tied for being least-full, then the designated component selects the candidate bucket belonging to the least-full routing table.

In one embodiment, if the least-full bucket is nevertheless full, an existing routing entry in the least-full bucket is discarded, in order to make room for inserting the new routing entry. In some embodiments, the discarded routing entry is not reinserted into any of the hash tables. This stands in contrast to some alternative approaches for hash table management, e.g., cuckoo hashing. In other embodiments, the discarded routing entry is reinserted into one of the hash tables using the same mechanism—i.e., by generating a hash value from each hash function and identifying the least-filled bucket, into which the discarded routing entry is inserted. At least in some embodiments, each routing entry includes a flag indicating whether the respective routing entry is valid. In such embodiments, a routing entry may be discarded by setting the flag to indicate that the routing entry is invalid.

In one embodiment, the routing key has Layer-2 routing information including a virtual local area network (VLAN) tag, a logical network (LN) identifier, and a media access control (MAC) address, each of which is further described below. The VLAN tag may indicate an assigned VLAN, which may be used to segregate traffic and to allow more than one uplink. There may be multiple VLANs on a single uplink. In some embodiments, each VLAN uses only one uplink port. In other words, only one physical uplink port may be used at any given time to forward a data frame associated with a given VLAN. In other embodiments, through the use of logical networks, a VLAN may use multiple physical ports to forward traffic while also maintaining traffic separation. Further, link aggregation may be used to bundle several physical links to act as one uplink with increased bandwidth.

In one embodiment, each logical network may have a respective LN identifier and may include a respective, logically specified network portion of the distributed network switch. Further, multiple logical networks may be included within a single bridge element. As such, a logical network may provide an additional layer of traffic separation. When so configured, logical networks may allow different clients to use the same VLAN tag. The VLANs of each client may remain segregated by virtue of the different logical networks.

In some embodiments, the MAC address may be generated and assigned by an Fibre Channel Forwarder (FCF), which may be a component of a controlling bridge operatively connected to the LRI 406. A FCF, also referred to herein as an FCoE switch, is configured to facilitate connectivity between FCoE initiators and Fibre Channel fabrics. For example, an FCoE data frame sent from a first virtual machine and intended for a second virtual machine may be addressed to the FCF in accordance with the FCoE standard. The FCF may receive and readdress the FCoE data frame for forwarding to the second virtual machine. The MAC address of the FCF may have been learned by the first server 105 during a discovery phase, when the FCF establishes communications with networked devices. During the discovery phase, the second server 106 may respond to broadcast queries from the first server 105. The FCF may discover the second server based on the query responses. After the discovery phase, a login phase may be initiated. A MAC address of the second server 106 may be reassigned by the FCF. The reassigned MAC address may be used for subsequent routing and communications between the servers 105, 106. The FCF may facilitate storage of MAC addresses assigned to the servers 105, 106.

At least in some embodiments, the routing table of each switch module serves as a standalone routing table in its own right and does not operate as a cache of any global routing table. In some alternative embodiments, however, the routing tables of each switch module may have a format similar to a global routing table of the controlling bridge operatively connected to the LRI 406. In such embodiments, the routing table of a given switch module may effectively serve as a local cache for a subset of entries of the global routing table of the controlling bridge. The routing tables may have a smaller capacity than the global routing table of the controlling bridge. The routing tables may be updated with routing information learned as a result of data frames flowing through the bridge elements of the distributed network switch.

In one embodiment, the routing tables may additionally be updated with routing information from the global routing table. For example, a given bridge element may receive a data frame that includes a destination MAC address that is not found in the routing table local to the given bridge element. To obtain routing information for forwarding the data frame, the bridge element may send a query to a second bridge element configured to access the controlling bridge. The second bridge element may search the global routing table for routing information associated with the destination MAC address. If the routing information is found in the global routing table, the second bridge element may forward the routing information through the distributed network switch and to the querying bridge element. The querying bridge element may store the routing information within the routing table local to the querying bridge element. Further, added, updated, or invalidated routing information in one or more of the routing tables may also be propagated to the global routing table of the controlling bridge. For example, a bridge element may send an update message to the controlling bridge in response to learning an updated or new MAC address. The global routing table may then be updated to reflect the updated or new MAC address.

In one embodiment, each routing entry in the routing table is uniquely identified using an associated entry address. As an example, a twenty-bit entry address 510 for a routing entry 508 in the bucket 504 is shown. The entry address 510 includes a 2-bit hash table identifier 512, a 2-bit slice identifier 514, a 13-bit bucket identifier 516, and a 3-bit routing entry offset 518. As shown, the routing entry 508 is a third entry in the bucket 504 of a first slice $506_5$ of the second hash table $502_2$ within the routing table. Assume the bucket 504 is a second-to-last bucket in the first slice $506_5$ of the second hash table $502_2$. The routing entry 508 may then be uniquely identified in the routing table via an entry address of 01001111111111110010 where, starting with the most significant bit, the first two bits of 01 refer to the second hash table $502_2$, the next two bits of 00 refer to the first slice $506_5$ within the second hash table $502_2$, the next thirteen bits of 1111111111110 refer to the second-to-last bucket 504 within the first slice $506_5$, and the last three bits of 010 refer to a location of a third routing entry within the second-to-last-bucket 504.

By configuring the routing table to use twenty-bit entry addresses, the routing table may support a maximum of 2^20 or 1024K total routing entries stored in the routing table, where each slice supports a maximum of 2^13 or 8,192 buckets, for a total of 2^16 or 65,536 routing entries stored in the respective slice. In some scenarios, regardless of the criteria used in selecting a hash function, depending on the exact values being hashed, the hash function may not necessarily distribute a set of routing entries perfectly uniformly within a hash table. Further, regardless of the criteria used in selecting a set of different hash functions, depending on the exact values being hashed, the set of different hash functions may not necessarily distribute a set of routing entries perfectly uniformly among a set of hash tables. In one embodiment, to reduce the frequency of collisions in the routing table when routing entries are not distributed perfectly uniformly, the routing table is configured to support a maximum storage capacity that can accommodate a count of routing entries greater than an anticipated count of routing entries by a predetermined amount. Doing so populates the routing table only to a predetermined extent when storing the anticipated count of routing entries. For example, assume the anticipated count is 2^19 or 512K routing entries. When storing the anticipated count of routing entries, the routing table described above is populated to fifty percent capacity and can operate efficiently even during times of imperfect distribution. Those skilled in the art will recognize that the number of bits used in representing the entry address and/or any part thereof may be tailored to suit the needs of a particular case, e.g., based on a total count of routing entries desired to be supported in the routing table, etc.

In one embodiment, by dividing the routing table into multiple hash tables, each hash table implemented as an independent array supporting parallel access relative to the arrays representing other hash tables, embodiments of the invention effectively increase access bandwidth supported by the routing table. The bandwidth is effectively increased because routing entries from different hash tables may be accessed in parallel. In addition, dividing the routing table into multiple hash tables as disclosed herein allows the bandwidth to be increased even further by optionally adopting a routing entry insertion mechanism that facilitates bandwidth balancing across hash tables, e.g., the steps 730 and 740 of FIG. 7 and the steps 906 and 908 of FIG. 9. For example, the routing entries may be inserted based on a set of insertion properties associated with the routing table, the set of insertion properties including bucket capacity, free hash table capacity, and slice lookup hit frequency, each of which is further described below.

In one embodiment, by dividing the each hash table into multiple slices, where each slice is implemented as an independent array supporting parallel access relative to the arrays representing other slices, embodiments of the invention effectively increase bandwidth provided by each hash table in the routing table. The bandwidth is effectively increased because routing entries from different slices may be accessed in parallel. In addition, dividing each hash table into multiple slices as disclosed herein allows the bandwidth to be increased even further by optionally adopting a routing entry insertion mechanism. For example, routing entries may be inserted into the routing table in a prescribed manner that facilitates bandwidth balancing across slices, e.g., the step of 910 FIG. 9 and the step 1040 of FIG. 10. Doing so balances access bandwidth to the routing table by evenly distributing lookup hits across hash tables and/or slices, in whole or in part.

Additionally or alternatively, bandwidth balancing across hash tables and/or slices may also be performed by preemptively assigning, to the hash tables, hash functions based on a prescribed hash function selection mechanism. For example, hash functions may be selected based on satisfying prescribed criteria for uniformly distributing access across hash tables and/or slices, in whole or in part. For instance, the hash functions may be selected based a set of hash properties including the avalanche property, the intra-hash collision property, the inter-hash collision property, and/or the inter-slice distribution property, each of which are further described above.

In one embodiment, when dividing the routing table into multiple hash tables in conjunction with dividing each hash table into multiple slices, parallel access in two dimensions of the routing table in FIG. 5 may be provided—i.e., in the horizontal direction across the hash tables 502 and in the vertical direction across slices 506. Doing so not only further increases the effective overall bandwidth provided by the routing table but also allows two-dimensional bandwidth balancing—i.e., in the horizontal direction across the hash tables 502 and in the vertical direction across slices 506. Those skilled in the art will recognize that the tradeoff between the increased bandwidth and increased processing overhead may be tailored to suit the needs of a particular case. For example, depending on the embodiment, hashing and/or slicing may be implemented using independent arrays configured to support parallel access. Additionally, owing to the hashed and/or sliced configuration of the routing table, bandwidth balancing may optionally be applied between hash tables and/or between slices—via the routing entry insertion mechanisms and/or the hash function selection mechanisms, both of which are further described herein.

Figure 6:
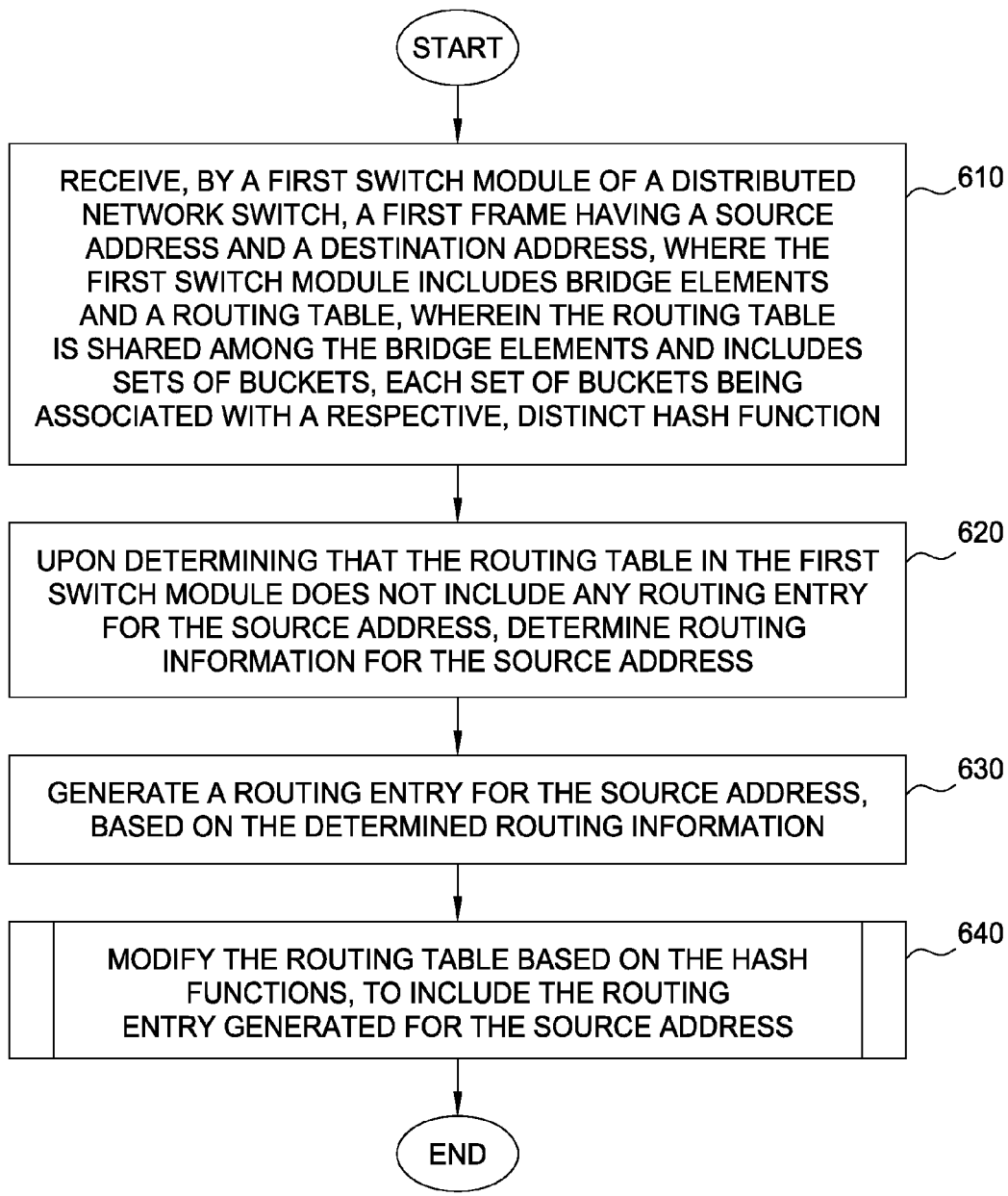
FIG. 6 is a flowchart depicting a method for hash-based routing table management in the distributed network switch, according to one embodiment of the invention.

FIG. 6 is a flowchart depicting a method 600 for hash-based routing table management in a distributed network switch, according to one embodiment of the invention. In particular, the method 600 is configured to update a routing table to reflect a source address. As shown, the method 600 begins at step 610, where a first switch module of the distributed network switch receives a frame having a source address and a destination address. The first switch module includes bridge elements and a routing table. The routing table is shared among the bridge elements and includes sets of buckets. Each set of buckets is associated with a respective, distinct hash function. Each bucket is configured to store up to a predetermined number of routing entries. Further, each bucket in each set of buckets is identifiable by a bucket identifier that is distinct within the respective set of buckets. In one embodiment, each set of buckets is stored in a respective hash table, and the hash tables together form the routing table of the first switch module.

At step 620, upon determining that the routing table in the first switch module does not include any routing entry for the source address, the first switch module determines routing information for the source address. At step 630, the first switch module generates a routing entry for the source address based on the determined routing information. At step 640, the first switch module modifies or requests to modify the routing table based on the distinct hash functions, to include the routing entry generated for the source address. The step 640 is further described below in conjunction with FIG. 7. After the step 640, the method 600 terminates.

Figure 7:
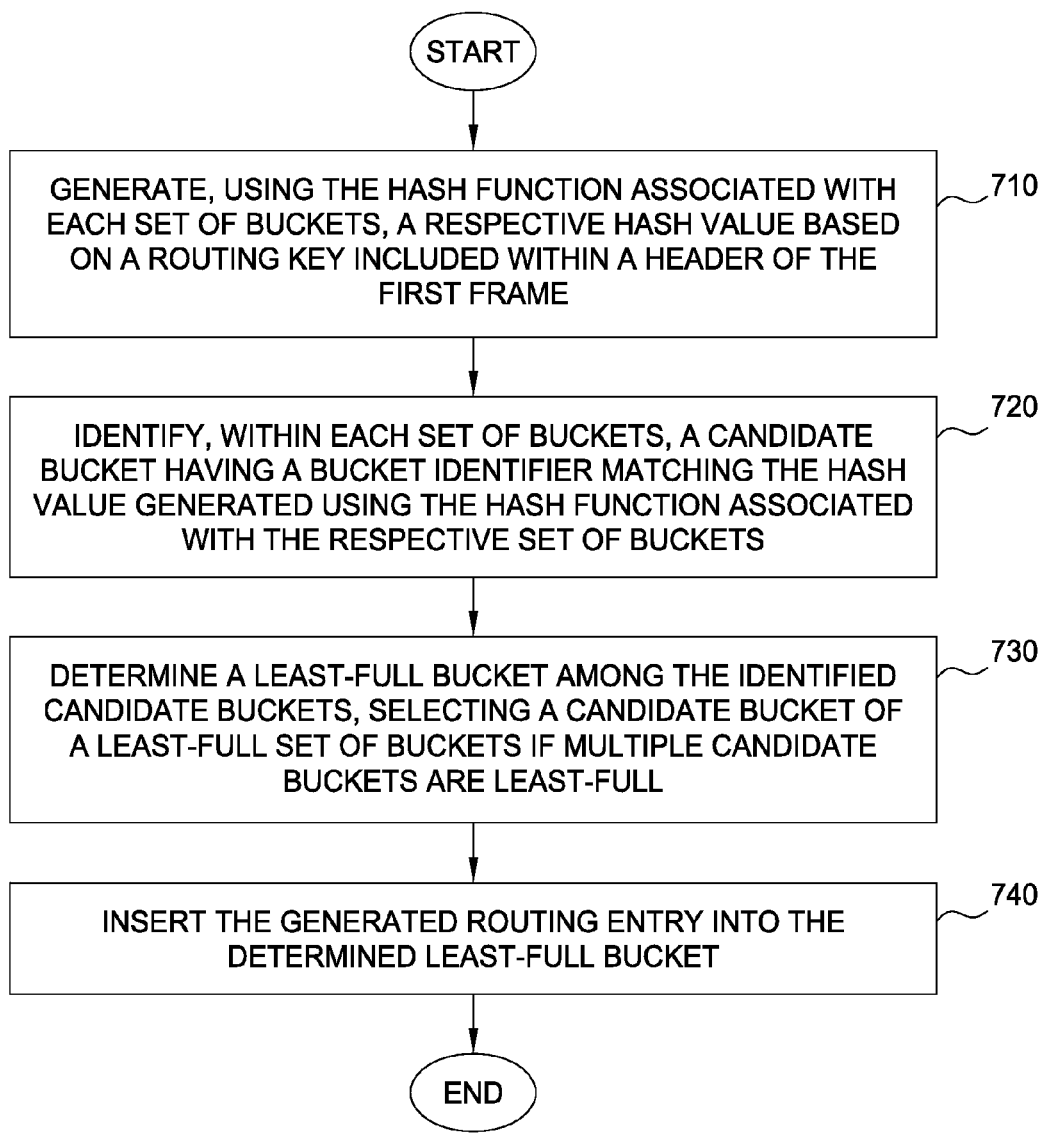
FIG. 7 is a flowchart depicting a method to modify the routing table based on distinct hash functions, according to one embodiment of the invention.

FIG. 7 is a flowchart depicting a method 700 to modify a routing table based on distinct hash functions, according to one embodiment of the invention. The method 700 corresponds to the step 640 of FIG. 6 and may be performed by a designated component of the distributed network switch. In some embodiments, the designated component is a switch module or a component thereof, such as the arbiter component of the routing table. In other embodiments, the designated component is an independent component configured to manage the routing table in response to requests received from switch modules in the distributed network switch.

As shown, the method 700 begins at step 710, where the designated component generates, using the hash function associated with each set of buckets, a respective hash value based on a routing key included within a header of the first frame. At step 720, the designated component identifies, within each set of buckets, a candidate bucket having a bucket identifier matching the hash value generated using the hash function associated with the respective set of buckets. At step 730, the designated component determines a least-full bucket among the identified candidate buckets. Depending on the embodiment, the least-full bucket may be the candidate bucket having a smallest count of (valid) routing entries. At least in some embodiments, if multiple candidate buckets are tied for having a smallest count of routing entries, then the designated component selects the candidate bucket belonging to the least-full hash table.

At step 740, the designated component inserts the generated routing entry into the determined least-full bucket. In one embodiment, inserting the generated routing entry includes, upon determining that the least-full bucket is full, discarding a routing entry in the least-full bucket to make room for the generated routing entry, without reinserting the discarded routing entry into any of the sets of buckets. In this regard, the routing entry may be selected to be discarded based on the routing entry having an age attribute greater than other routing entries. If multiple routing entries are tied in terms of having the greatest age attribute, then a routing entry may be selected from the multiple routing entries based on a predetermined priority scheme, to be discarded. An example of the predefined priority scheme is random selection. After the step 740, the method 700 terminates.

Figure 8:
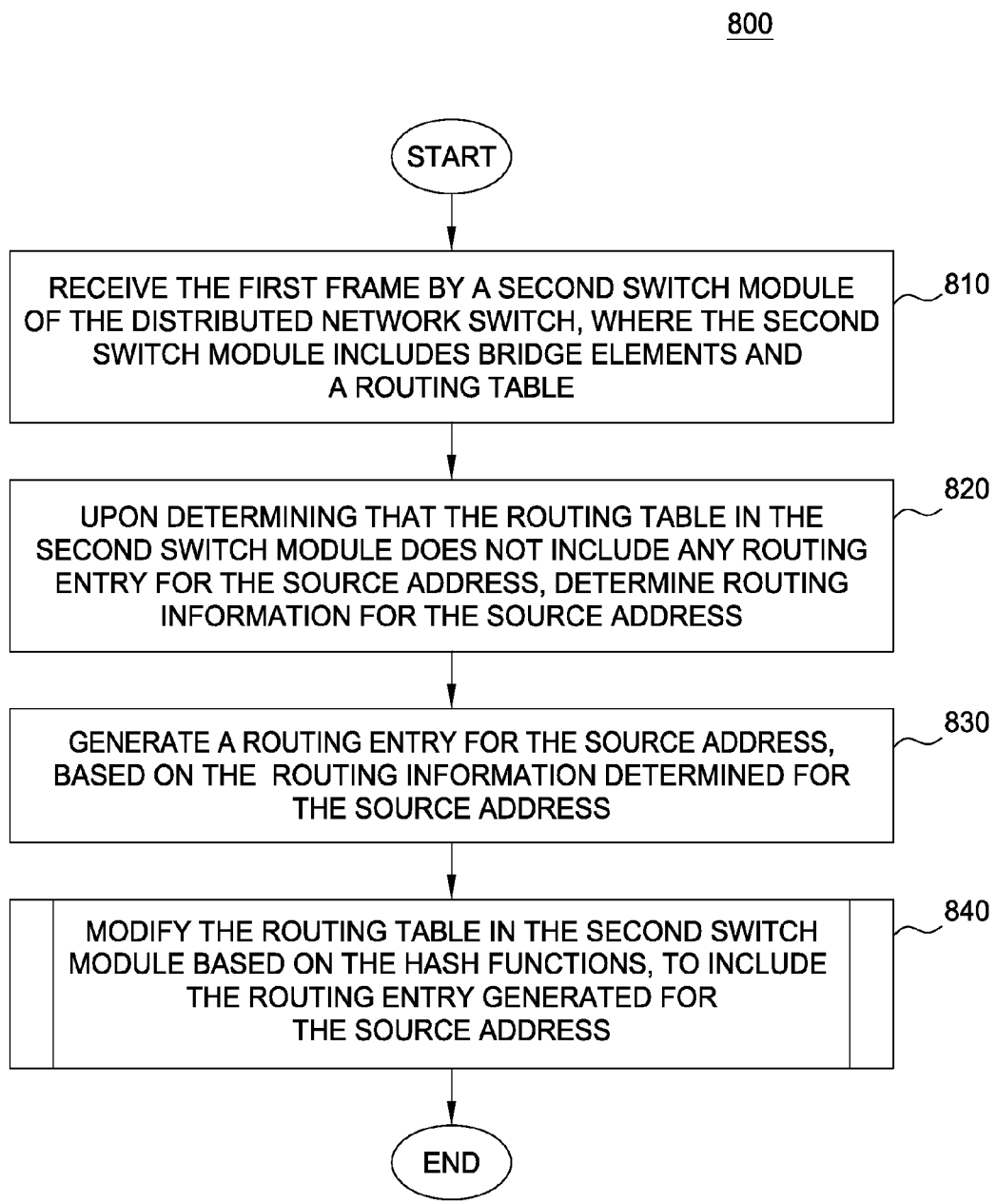
FIG. 8 is a flowchart depicting a method to update the routing table to reflect a source address, according to one embodiment of the invention.

FIG. 8 is a flowchart depicting a method 800 to update a routing table to reflect a source address, according to one embodiment of the invention. As shown, the method 800 begins at step 810, where a second switch module of the distributed network switch receives the frame having the source address and the destination address. The second switch module includes bridge elements and a routing table. The routing table is shared among the bridge elements and includes sets of buckets, and each set of buckets is associated with a respective, distinct hash function.

At step 820, upon determining that the routing table in the second switch module does not include any routing entry for the source address, the second switch module determines routing information for the source address. At step 830, the second switch module generates a routing entry for the source address based on the determined routing information. At step 840, the second switch module modifies or requests to modify the routing table based on the distinct hash functions, to include the routing entry generated for the source address. The step 840 is further described above in conjunction with FIG. 7. After the step 840, the method 800 terminates.

Figure 9:
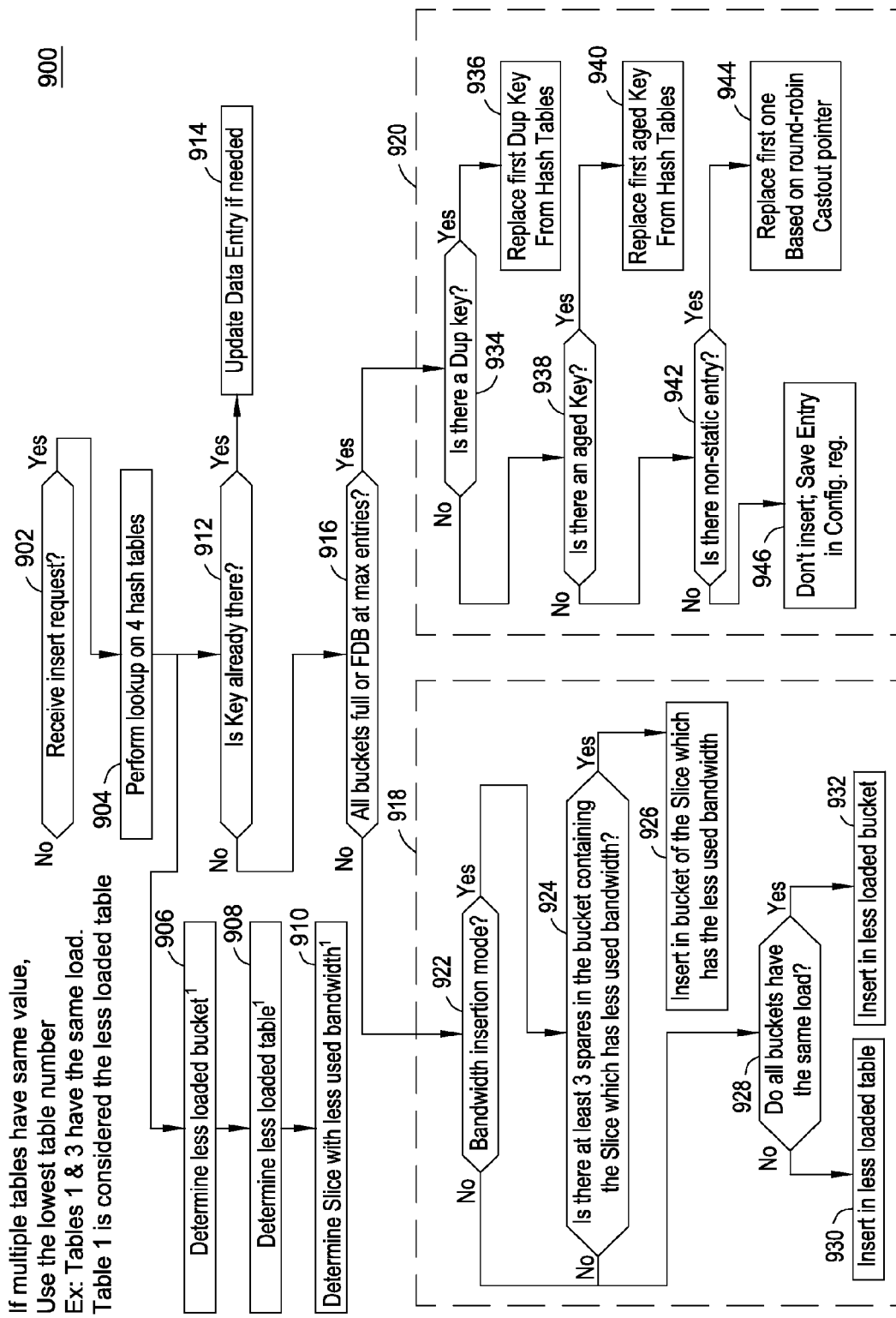
FIG. 9 is a flowchart depicting a method to insert a routing entry into the routing table, according to one embodiment of the invention.

FIG. 9 is a flowchart depicting a method 900 to insert a routing entry into the routing table, according to one embodiment of the invention. As shown, the method begins at step 902, where the designated component receives a request to insert a routing entry into the routing table, based on a routing key. As described above, the routing key includes a VLAN tag, a LN identifier, and a MAC address. At step 904, the designated component performs a lookup on each hash table of the routing table. At least in some embodiments, the designated component may additionally perform a set of operations including determining a least loaded bucket as a candidate bucket (step 906), determining a least-loaded hash table as a candidate table (step 908), and determine a slice that uses a least amount of bandwidth, as a candidate slice (step 910). A candidate bucket, candidate hash table, and candidate slice may also be referred to herein as a "candidate". If a routing entry having an identical routing key already exists (step 912), the designated component optionally updates the routing entry responsive to the request (step 914).

In one embodiment, if no routing entry already exists (step 912), then the designated component determines whether the routing table is full or that all candidates are full (step 916). If not, the designated component optionally performs one or more operations 918 configured to balance bandwidth used between slices of each hash table, also referred to herein as bandwidth-balancing operations. To this end, the designated component first determines whether bandwidth insertion mode is active (step 922). If so, the designated component determines whether there is sufficient space for a predefined number of routing entries in the bucket of the candidate slice (step 924). If so, the designated component inserts the routing entry into the bucket of the candidate slice (step 926). Otherwise, the designated component determines whether all candidate buckets are equally filled with valid routing entries (step 928). If so, the routing entry is inserted in the least-filled hash table (step 932). Otherwise, the routing entry is inserted in the least-filled bucket (step 930).

On the other hand, if the routing table is full or all candidates are full (step 916), then the method 900 terminates subsequent to one or more additional operations 920. The additional operations 920 include replacing a duplicate routing key in the hash tables if the duplicate routing key exists (steps 934 and 936), replacing a first aged routing key from the routing tables if the aged routing key exists (steps 938 and 940), and replacing a first non-static routing entry based on a predefined pointer if the non-static routing entry exists (steps 942 and 944). In one embodiment, the predefined point is a round-robin castout pointer. Otherwise, the designed component does not insert the routing entry into the routing table but instead stores the routing entry in a predetermined location, such as a configuration registry. At least in some embodiments, one or more of the additional operations 920 are optional. Additionally or alternatively, one or more of the steps of the method 900 may be optional.

Figure 10:
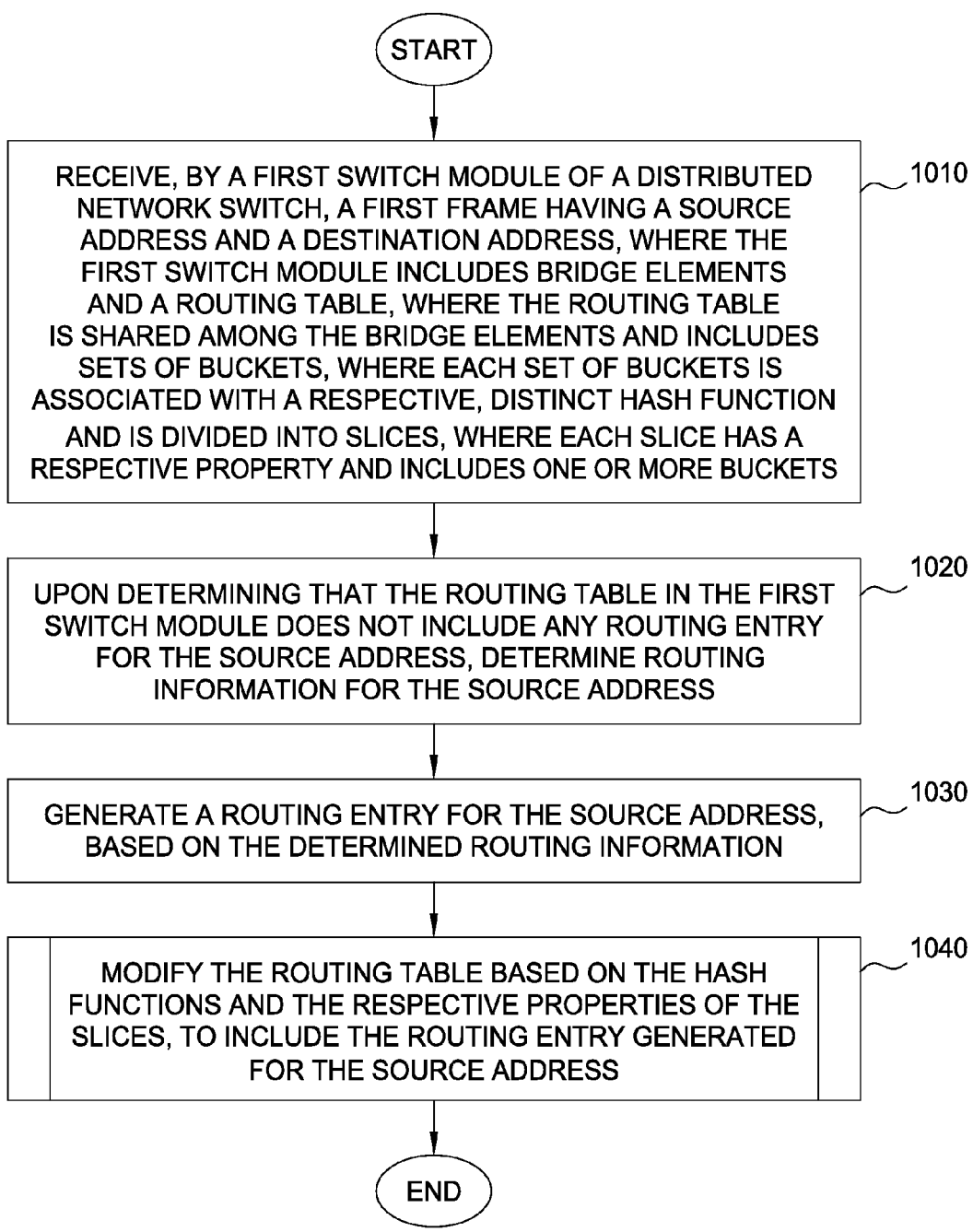
FIG. 10 is a flowchart depicting a method for sliced routing table management in the distributed network switch, according to one embodiment of the invention.

FIG. 10 is a flowchart depicting a method 1000 for sliced routing table management in the distributed network switch, according to one embodiment of the invention. In particular, the method 1000 is configured to update a sliced routing table to reflect a source address. As shown, the method 1000 begins at step 1010, where the first switch module of the distributed network switch receives a frame having a source address. The first switch module includes bridge elements and a sliced routing table. The sliced routing table is shared among the bridge elements and includes sets of buckets, and each set of buckets is associated with a respective, distinct hash function as described above. Further, each set of buckets is divided into slices, each slice having a respective property and including one or more buckets. For example, each slice may have an access frequency property that is maintained by the arbiter component of the distributed network switch, based on monitored access to the sliced routing table.

At step 1020, upon determining that the sliced routing table in the first switch module does not include any routing entry for the source address, the first switch module determines routing information for the source address. At step 1030, the first switch module generates a routing entry for the source address based on the determined routing information. At step 1040, the first switch module modifies or requests to modify the sliced routing table based on the distinct hash functions and the respective properties of the slices, to include the routing entry generated for the source address. The step 1040 is further described above in conjunction with the operations 918 of FIG. 9. After the step 1040, the method 1000 terminates. At least in some embodiments, the frame is forwarded based on routing information determined for the destination address. Configuring and operating the routing table as disclosed herein may increase access bandwidth provided by the routing table at least in some cases.

Embodiments of the invention provide techniques for hash-based routing table management in a distributed network switch. In one embodiment, a switch module receives a frame having a source address and a destination address. If the switch module does not find any routing entry for the source address in a routing table of the switch module, the switch module determines routing information for the source address and generates a routing entry for the source address based on the routing information. The switch module then modifies the routing table based on the hash functions, to include the routing entry generated for the source address. The routing table may also be configured to include multiple slices supporting parallel routing entry lookups, and the routing table may be modified based further on properties of the slices. Accordingly, the distributed network switch may operate more efficiently at least in some cases.

While the foregoing is directed to embodiments of the present invention, other and further embodiments of the invention may be devised without departing from the basic scope thereof, and the scope thereof is determined by the claims that follow.

What is claimed is:

1. A computer-implemented method for hash-based routing table management in a distributed network switch comprising a plurality of switch modules including a first switch module, the computer-implemented method comprising:

receiving, by the first switch module, a first frame having a source address and a destination address, wherein the first switch module comprises a plurality of bridge elements and a routing table, wherein the routing table in the first switch module is shared among the plurality of bridge elements in the first switch module and includes a plurality of sets of buckets, wherein each set of buckets is associated with a respective hash function of a plurality of distinct hash functions and is divided into a plurality of slices of buckets, each slice having a respective property and including one or more buckets, each bucket storing one or more routing entries, wherein each slice of each set of buckets is accessible in parallel;

upon determining that the routing table in the first switch module does not include any routing entry for an address selected from the source address and the destination address of the first frame, generating, in the routing table, a routing entry for the selected address, based on routing information determined for the selected address and based further on at least one hash function of the plurality of hash functions and at least one property of the respective properties of the plurality of slices, wherein the generated routing entry stores a routing key included within a header of the first frame; and forwarding the first frame based on the determined routing information and to a second switch module of the distributed network switch, the second switch module having a routing table, wherein the second switch module is operable to, upon determining that the routing table in the second switch module does not include any routing entry for the selected address, generate, in the routing table in the second switch module, a routing entry for the selected address, based on routing information determined for the selected address and based further on at least one hash function associated with the routing table of the second switch module.

2. The computer-implemented method of claim 1, wherein access to the plurality of slices of each set of buckets is managed by an arbiter component of the routing table of the first switch module, wherein each slice of each set of buckets is identified via a predefined subset of bits of hash function output, wherein access to each slice of each set of buckets is monitored by the arbiter component, wherein the respective properties of the plurality of slices are updated based on the monitored access.

3. The computer-implemented method of claim 2, wherein each set of buckets is stored in a respective hash table of the routing table in the first switch module, wherein the routing key includes Layer-2 routing information comprising a virtual local area network (VLAN) tag, a logical network (LN) identifier, and a media access control (MAC) address;

wherein each slice includes an array data structure, wherein each hash function is selected based on: (i) an avalanche property of the respective hash function; (ii) an intra-hash collision property of the respective hash function; (iii) an inter-hash collision property of the respective hash function; and (iv) an inter-slice distribution property of the respective hash function.

4. The computer-implemented method of claim 3, wherein the respective property of each slice of the plurality of slices comprises an access frequency property of the respective slice, wherein each bucket in each set of buckets is identifiable by a bucket identifier that is distinct within the respective set of buckets, and wherein the computer-implemented method further comprises modifying the routing table of the first switch module, comprising:

generating, using the hash function associated with each set of buckets, a respective hash value based on the routing key included within the header of the first frame;

identifying, within each set of buckets, a candidate bucket having a bucket identifier matching the hash value generated using the hash function associated with the respective set of buckets;

upon determining that an access frequency mode is enabled, determining a bucket among the identified candidate buckets, belonging to a least-frequently accessed slice;

upon determining that the access frequency mode is disabled, determining one of: (i) a least-full bucket among the identified candidate buckets and (ii) a least-full bucket among the identified candidate buckets and belonging to a least-full set of buckets of the plurality of sets of buckets, upon determining a presence of multiple least-full buckets; and inserting the generated routing entry into the determined bucket.

5. The computer-implemented method of claim 4, wherein the least-full bucket is selected from one of: (i) the candidate bucket having a smallest count of valid routing entries and (ii) the candidate bucket having a smallest count of valid routing entries and belonging to the set of buckets having a smallest count of valid routing entries; wherein inserting the generated routing entry into the determined bucket comprises:

upon determining that the least-full bucket is full, discarding the a routing entry in the least-full bucket to make room for the generated routing entry, without reinserting the discarded routing entry into any of the plurality of sets of buckets.

6. The computer-implemented method of claim 1, wherein access to the plurality of slices of each set of buckets is managed by an arbiter component of the routing table of the first switch module.

7. The computer-implemented method of claim 1, wherein each slice of each set of buckets is identified via a predefined subset of bits of hash function output.

8. The computer-implemented method of claim 1, wherein access to each slice of each set of buckets is monitored by an arbiter component of the routing table of the first switch module, wherein the respective properties of the plurality of slices are updated based on the monitored access.

9. The computer-implemented method of claim 1, wherein each set of buckets is stored in a respective hash table of the routing table in the first switch module.

10. The computer-implemented method of claim 1, wherein the routing key includes Layer-2 routing information comprising a virtual local area network (VLAN) tag, a logical network (LN) identifier, and a media access control (MAC) address.

11. A computer-implemented method to increase access bandwidth of a routing table by distributing lookup hits in the routing table across hash tables and slices, the computer-implemented method comprising:

providing the routing table, wherein the routing table is shared between a plurality of bridge elements of a first switch module of a plurality of switch modules in a distributed network switch, wherein the routing table is divided into a plurality of hash tables accessible in parallel, each hash table having a distinct hash function, wherein at least one hash function is selected based on a predefined set of hash properties, wherein each hash table is divided into a plurality of slices accessible in parallel, each slice including one or more buckets, each bucket adapted to store one or more routing entries;

receiving a first frame having a source address and a destination address; and facilitating, at least in part, even distribution of a plurality of subsequent lookup hits expected to occur for a plurality of routing entries, by preemptively inserting the plurality of routing entries based on a predefined set of insertion properties, comprising: upon determining that the routing table does not include any routing entry for an address selected from the source address and the destination address of the first frame, generating, in the routing table, a routing entry for the selected address, based on routing information determined for the selected address and based further on at least one hash function of the plurality of hash functions and at least one insertion property of the predefined set of insertion properties, wherein the generated routing entry stores a routing key included within a header of the first frame; and forwarding the first frame based on the determined routing information and to a second switch module of the distributed network switch, the second switch module having a routing table, wherein the second switch module is configured operable to, upon determining that the routing table in the second switch module does not include any routing entry for the selected address, generate, in the routing table in the second switch module, a routing entry for the selected address, based on routing information determined for the selected address and based further on at least one hash function associated with the routing table of the second switch module.

12. The computer-implemented method of claim 11, wherein the predefined set of insertion properties includes at least one of free bucket capacity, free hash table capacity, and slice lookup hit frequency.

13. The computer-implemented method of claim 12, further comprising:

facilitating, at least in part, even distribution of the plurality of subsequent lookup hits expected to occur in the routing table for the plurality of routing entries, by preemptively selecting the hash functions based on the predefined set of hash properties, wherein the predefined set of hash properties includes at least one of an avalanche property, an intra-hash collision property, an inter-hash collision property, and an inter-slice distribution property.

14. The computer-implemented method of claim 13, wherein the distributed network switch includes an arbiter component operable to provide access to the routing table, wherein the plurality of routing entries are inserted into the routing table by the arbiter component.

15. The computer-implemented method of claim 14, wherein the predefined set of insertion properties includes free bucket capacity, free hash table capacity, and slice lookup hit frequency, and wherein the set of predefined hash properties includes the avalanche property, the intra-hash collision property, the inter-hash collision property, and the inter-slice distribution property.

16. The computer-implemented method of claim 11, wherein access to the plurality of slices of each set of buckets is managed by an arbiter component of the routing table of the first switch module.

17. The computer-implemented method of claim 11, wherein each slice of each set of buckets is identified via a predefined subset of bits of hash function output.

18. The computer-implemented method of claim 11, wherein access to each slice of each set of buckets is monitored by an arbiter component of the routing table of the first switch module, wherein the respective properties of the plurality of slices are updated based on the monitored access.

* * * * *